(12) United States Patent
Lefebvre et al.

(10) Patent No.: US 10,844,746 B2
(45) Date of Patent: Nov. 24, 2020

(54) BEARING HOUSING

(71) Applicant: PRATT & WHITNEY CANADA CORP., Longueuil (CA)

(72) Inventors: Guy Lefebvre, St-Bruno-de-Montarville (CA); Remy Synnott, St-Jean-Sur-Richelieu (CA); François Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/369,688

(22) Filed: Mar. 29, 2019

(65) Prior Publication Data

US 2020/0308984 A1    Oct. 1, 2020

(51) Int. Cl.
| | |
|---|---|
| *F01D 25/16* | (2006.01) |
| *F01D 21/04* | (2006.01) |
| *F16C 33/40* | (2006.01) |
| *F16C 33/46* | (2006.01) |

(52) U.S. Cl.
CPC ......... *F01D 25/164* (2013.01); *F01D 21/045* (2013.01); *F01D 25/162* (2013.01); *F16C 33/405* (2013.01); *F16C 33/4635* (2013.01); *F05D 2220/32* (2013.01); *F05D 2240/54* (2013.01); *F16C 2360/23* (2013.01)

(58) Field of Classification Search
CPC ........ F16C 19/08; F16C 19/522; F16C 27/04; F16C 33/3843; F16C 33/4623; F16C 33/405; F16C 2360/23; F16C 2360/24; F01D 21/045; F01D 25/162; F01D 25/164; F05D 2220/32; F05D 2240/54; F05D 2300/505

USPC ......... 384/99, 510, 534, 551, 559, 581, 585, 384/560, 563, 526; 415/9, 124.2, 229; 416/2

See application file for complete search history.

(56) References Cited

U.S. PATENT DOCUMENTS

| | | | | |
|---|---|---|---|---|
| 3,011,840 | A | * | 12/1961 | Littleford ................ F16C 27/04 384/581 |
| 4,084,861 | A | | 4/1978 | Greenberg et al. |
| 4,214,796 | A | | 7/1980 | Monzel et al. |
| 4,451,110 | A | | 5/1984 | Forestier et al. |
| 6,109,022 | A | * | 8/2000 | Allen ...................... F01D 5/025 60/223 |
| 6,491,497 | B1 | * | 12/2002 | Allmon ................. F01D 21/045 384/495 |
| 7,384,199 | B2 | * | 6/2008 | Allmon ................. F01D 25/164 384/581 |
| 7,524,112 | B2 | | 4/2009 | Gerez et al. |

(Continued)

FOREIGN PATENT DOCUMENTS

| | | |
|---|---|---|
| CA | 2638592 C | 4/2016 |
| CN | 108691893 B | 9/2019 |

*Primary Examiner* — Marcus Charles
(74) *Attorney, Agent, or Firm* — Norton Rose Fulbright Canada LLP

(57) ABSTRACT

There is disclosed a bearing assembly for a gas turbine engine including at least two bearings axially spaced from one another relative to a central axis, and a squirrel cage secured to a casing of the gas turbine engine. The squirrel cage supports respective bearing loads of the at least two bearings. The squirrel cage has a frangible section between the bearings configured to preferentially fail upon application of a load greater than a preselected threshold bearing load.

20 Claims, 4 Drawing Sheets

(56) References Cited

U.S. PATENT DOCUMENTS

| | | | |
|---|---|---|---|
| 7,648,277 B2 | 1/2010 | Laurant et al. | |
| 7,857,519 B2 | 12/2010 | Kostka et al. | |
| 8,136,999 B2 * | 3/2012 | Mons | F01D 21/045 |
| | | | 384/581 |
| 8,167,531 B2 * | 5/2012 | Mollmann | F01D 21/045 |
| | | | 415/1 |
| 8,182,153 B2 | 5/2012 | Singh et al. | |
| 8,182,156 B2 | 5/2012 | Kinnaird et al. | |
| 8,322,038 B1 * | 12/2012 | Heidari | F02C 7/06 |
| | | | 29/898 |
| 8,672,801 B2 | 3/2014 | McCune et al. | |
| 8,727,632 B2 * | 5/2014 | Do | F01D 25/164 |
| | | | 384/472 |
| 8,777,490 B2 | 7/2014 | Turbomeca et al. | |
| 9,464,669 B2 | 10/2016 | Kerr et al. | |
| 9,599,152 B2 | 3/2017 | Freeman et al. | |
| 9,702,404 B2 * | 7/2017 | Smedresman | F16C 27/04 |
| 9,784,128 B2 | 10/2017 | Long et al. | |
| 9,897,140 B2 | 2/2018 | Gorajski et al. | |
| 9,909,451 B2 * | 3/2018 | Carter | F01D 25/164 |
| 9,932,986 B2 | 4/2018 | DiBenedetto | |
| 9,933,017 B2 | 4/2018 | Long et al. | |
| 10,041,534 B2 * | 8/2018 | Ganiger | F01D 21/08 |
| 10,196,934 B2 * | 2/2019 | Khan | F01D 25/164 |
| 10,352,194 B2 | 7/2019 | Varney et al. | |
| 10,494,950 B2 | 12/2019 | Kovacik et al. | |
| 2011/0206498 A1 * | 8/2011 | McCooey | F02C 3/107 |
| | | | 415/124.1 |
| 2011/0286836 A1 * | 11/2011 | Davis | F01D 25/16 |
| | | | 415/170.1 |
| 2013/0108202 A1 | 5/2013 | Do et al. | |
| 2013/0280063 A1 * | 10/2013 | Ganiger | F16C 19/54 |
| | | | 415/229 |
| 2017/0234157 A1 | 8/2017 | Khan et al. | |
| 2019/0063261 A1 | 2/2019 | Varney et al. | |

\* cited by examiner

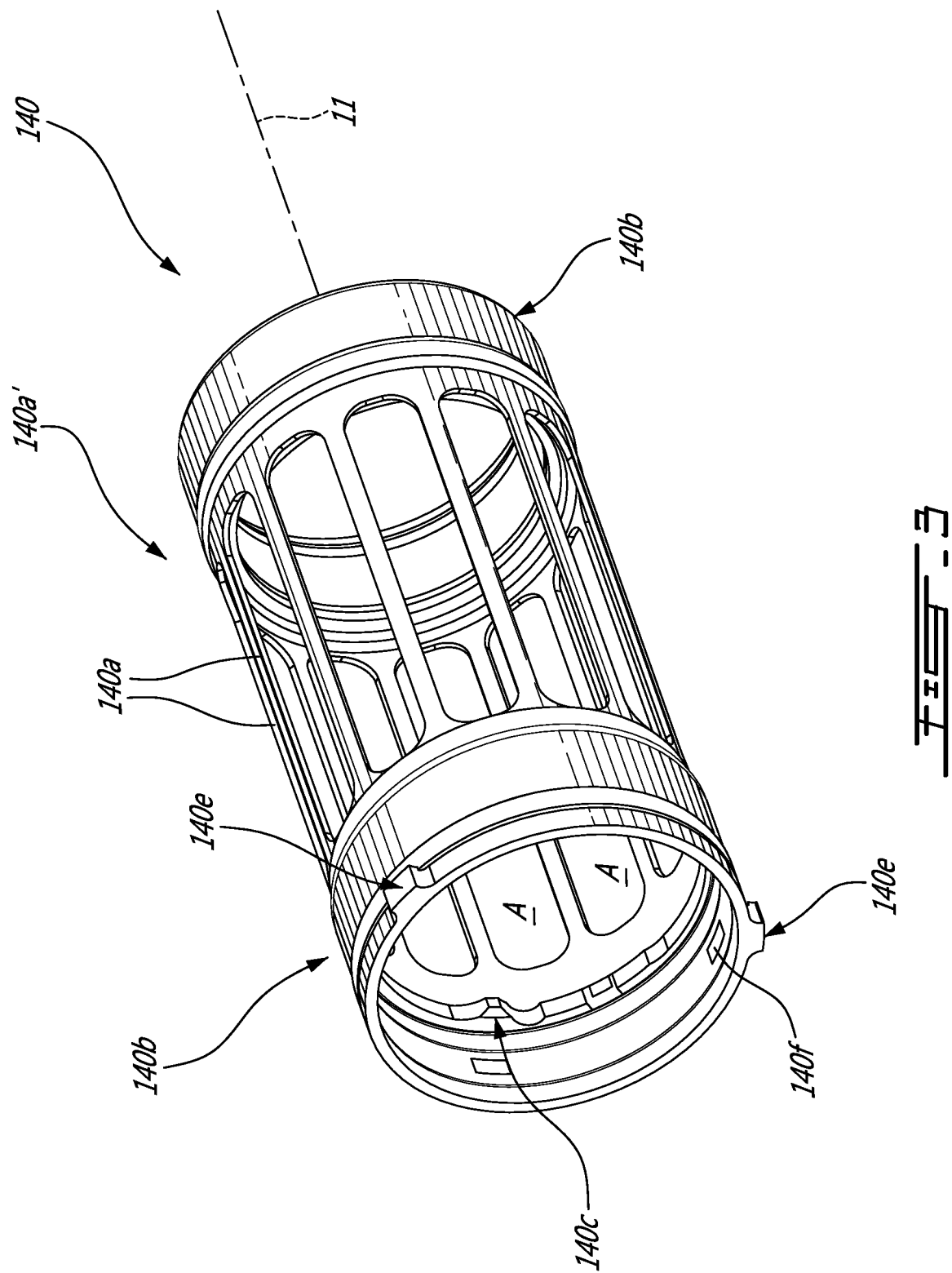

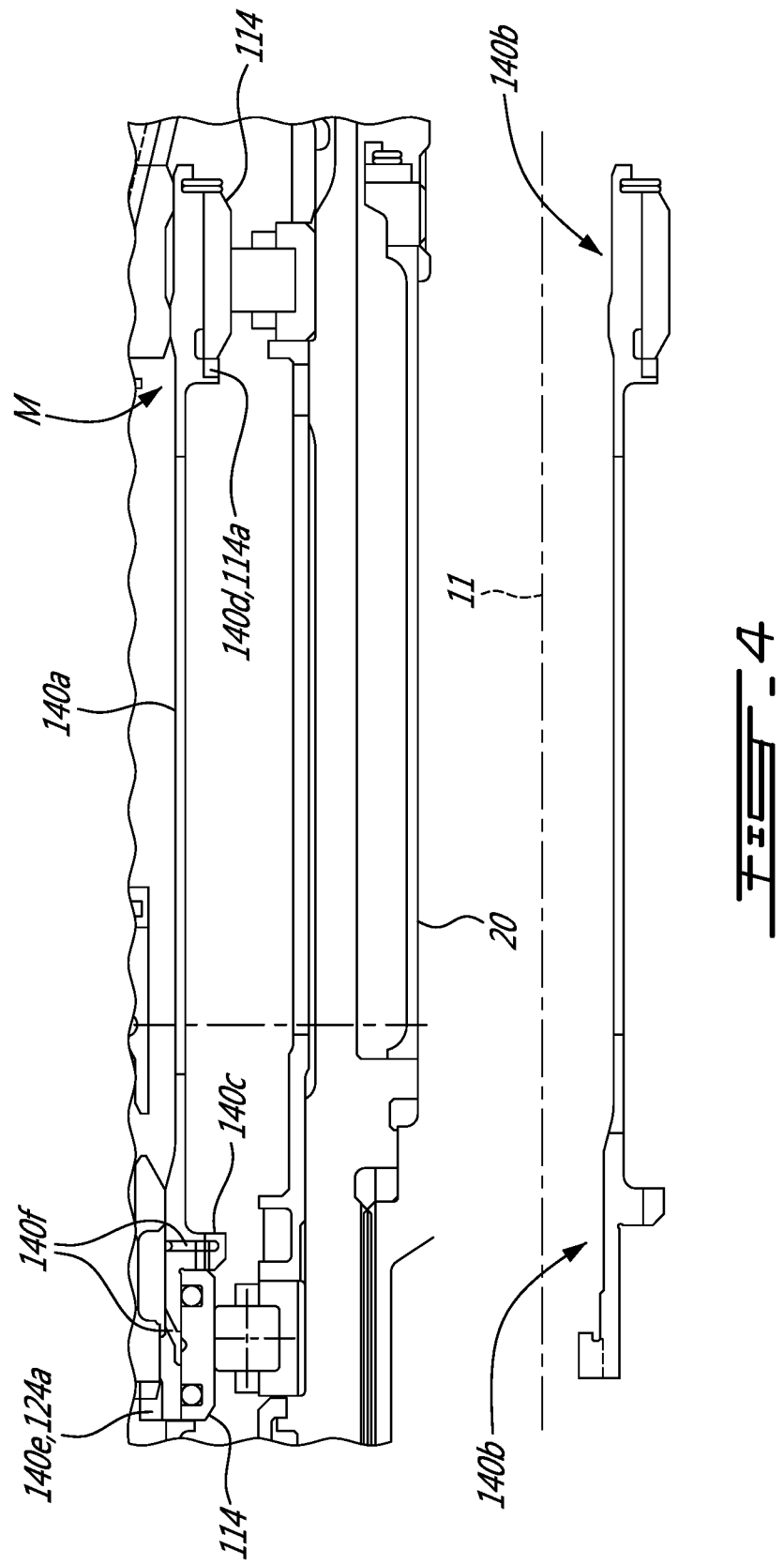

BEARING HOUSING

TECHNICAL FIELD

The application relates generally to gas turbine engines and, more particularly, to bearing housing assemblies used in such engines.

BACKGROUND OF THE ART

In a gas turbine engine, a rotary shaft holding compressor/fan and turbine blades is rotatably mounted within a casing via bearings. The bearings are typically located radially inwards relative to the annular flow path formed by duct walls of the casing. A bearing housing usually encloses the bearings and defines a bearing cavity for receiving lubricant for lubricating the bearings. Due to the forces inherent to gas turbine engine operation, and as they are the interface between shafts and a support structure, the bearings are exposed lo loads, vibrations, etc that may affect their performance over time.

SUMMARY

In one aspect, there is provided a bearing assembly for a gas turbine engine comprising at least two bearings axially spaced from one another relative to a central axis, and a squirrel cage secured to a casing of the gas turbine engine, the squirrel cage supporting respective bearing loads of the at least two bearings, wherein the squirrel cage has a frangible section between the bearings configured to preferentially fail upon application of a load greater than a preselected threshold bearing load.

In another aspect, there is provided a gas turbine engine, comprising a shaft rotatable about a central axis, the shaft at least partially supported by two bearings, the two bearings being axially spaced apart relative to the central axis, a squirrel cage extending between the two bearings having a reduced cross-section frangible section configured to fail upon application of a bearing load greater than a preselected threshold load.

In yet another aspect, there is provided a method of operating a bearing assembly, comprising: coupling a first bearing to a second bearing via a squirrel cage, the first and second bearings being axially spaced apart relative to a central axis; receiving a first load at the first bearing and a second load at the second bearing; and preferentially failing the squirrel cage at a frangible portion between the first and second bearings upon a preselected load differential between the first load and the second load.

DESCRIPTION OF THE DRAWINGS

Reference is now made to the accompanying figures in which:

FIG. 3 is a schematic three-dimensional view of a squirrel cage of a bearing assembly of the gas turbine of FIG. 1 in accordance with one embodiment; and FIG. 4 is a schematic enlarged view of a portion of FIG. 2.

DETAILED DESCRIPTION

Figure 1:
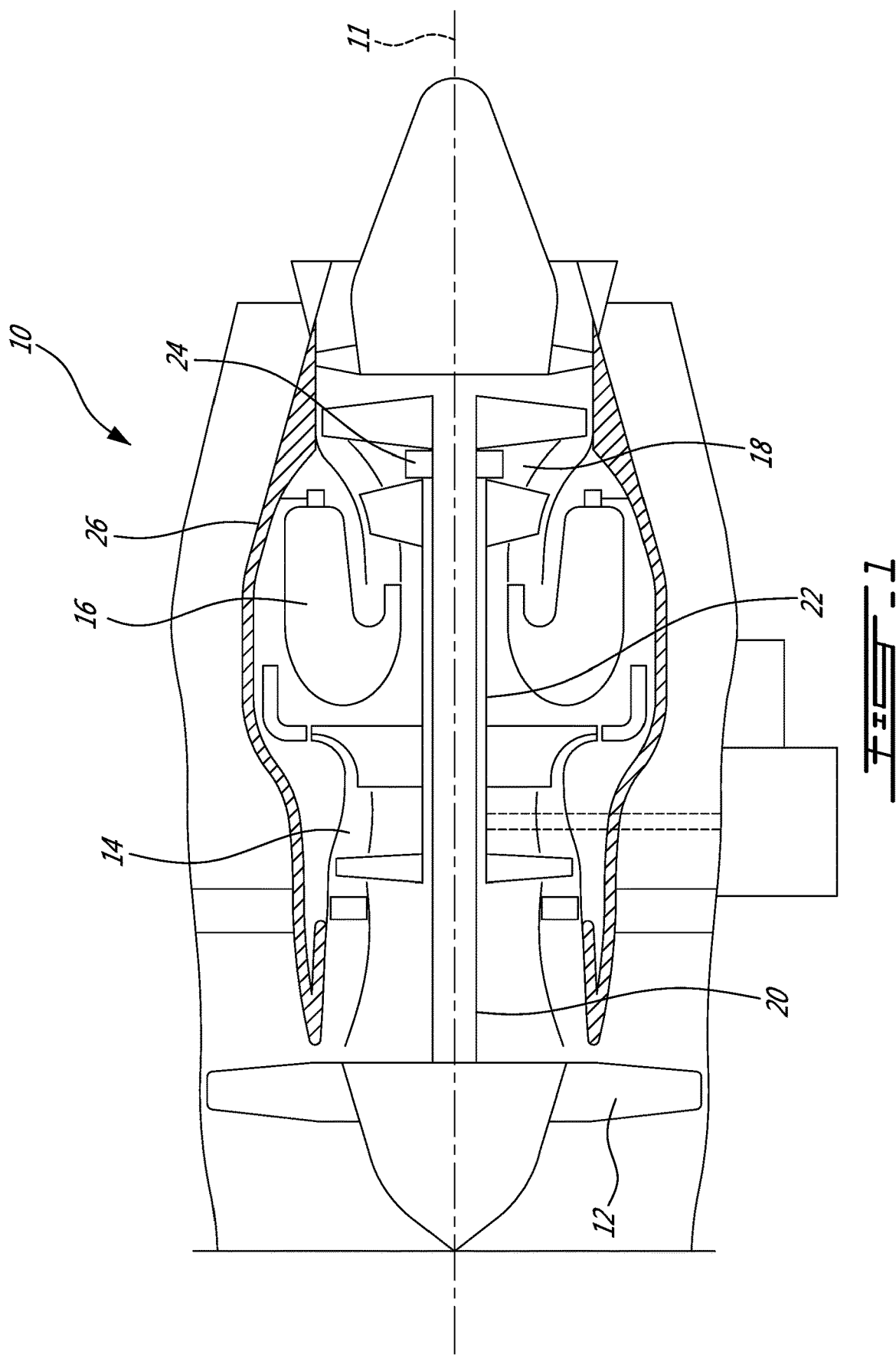
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11.

The compressor section 14, fan 12 and turbine section 18 have rotating components which can be mounted on one or more shafts 20, 22, which, in this embodiment, rotate concentrically around the central axis 11. Bearings 24 are used to provide smooth relative rotation between a shaft (20 or 22) and casings 26, 28 (FIG. 2) (non-rotating component), and/or between the two shafts 20, 22 which rotate at different speeds.

Figure 2:
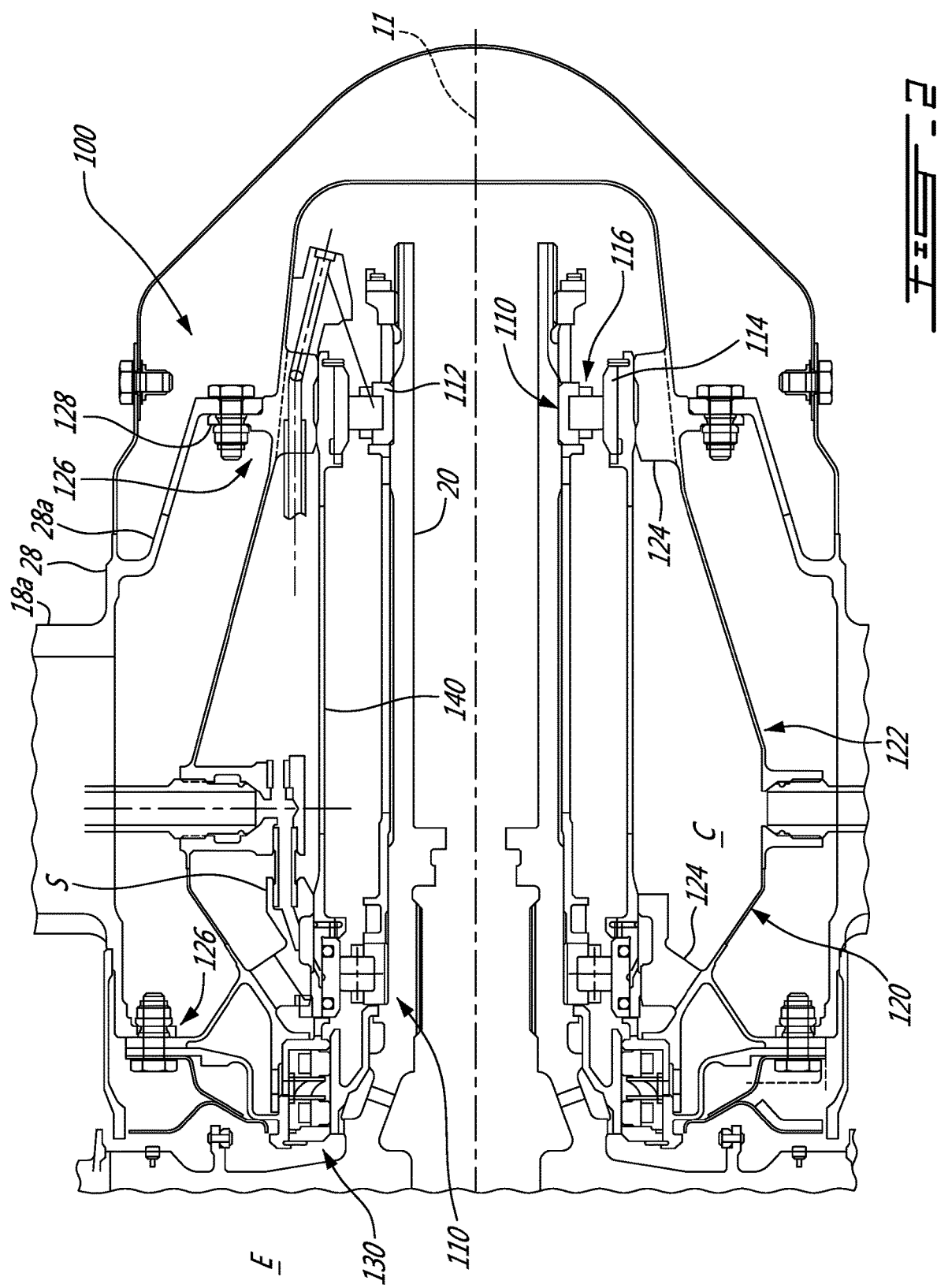
FIG. 2 is a schematic cross-sectional view of a portion of the gas turbine engine of FIG. 1 in accordance with one embodiment.

Referring now to FIG. 2, a cross-sectional view of a portion of the turbine section 18 is illustrated. A bearing assembly is generally shown at 100. The bearing assembly 100 is located radially inwardly of vanes 18a of the turbine section 18 relative to the central axis 11.

The bearing assembly 100 includes bearings 110 and a bearing housing 120 enclosing the bearings 110. The bearing housing 120 is used for defining a bearing cavity C circumferentially extending around the axis 11. The bearing cavity C is used for receiving lubricant from a lubrication system S for lubricating the bearings 110. The bearing 110 and the bearing housing 120 are described in succession herein below.

Still referring to FIG. 2, two bearings 110 are shown and are axially offset from each other relative to the central axis 11. It is understood that the gas turbine engine 10 may include more than one bearing. For the sake of clarity, only one of the two bearings 110 is described herein below using the singular form, but the description may apply to both of the bearings 110.

The bearing 110 is used to allow a rotation of the shaft 20 relative to the bearing housing 120 and to substantially maintain a radial position of the shaft 20 relative to the casing 28 of the gas turbine engine 10. The bearing 110 includes an inner race 112 secured to the shaft 20, an outer race 114 secured to the bearing housing 120 and/or rolling elements 116 located radially between the inner and outer races 112, 114. The rolling elements 116 may be spherically, cylindrically, frustoconically shaped, among examples. Any suitable bearing known in the art may be used.

Since the shaft 20 may rotate at a relatively high speed relative to the casing 26, proper lubrication of the bearings 110 may be required. As aforementioned, the lubrication system S injects the lubricant within the bearing cavity C. It might be desirable to keep the lubricant within the bearing cavity C. This function may be carried by the bearing housing 120 and sealing members 130. The sealing members 130 may be located radially between the bearing housing 120 and the shaft 20. In the embodiment shown, a runner is secured to the shaft and the sealing members 130 may define a sealing interface between said runner and a sealing element of the sealing members 130. The sealing element may be, for instance, a ring circumferentially extending all around the central axis 11. The sealing member 130 may be a controlled gap seal or a carbon seal. Any suitable seal may be used.

In the depicted embodiment, the bearing housing 120 includes a case 122, also referred to as a wall, that circumferentially extends all around the central axis 11. The case 122 extends axially relative to the central axis 11 and may span a distance between the two bearings 110. In the embodiment shown, an axial distance relative to the central axis between the two bearings 110 is greater than a chord length of the vane 18a. The axial distance may be at least as great as a diameter of the shaft.

Two bearing supports 124 (more than two may be used if more bearings are present) are secured at axial extremities of the case 122. Each of the two bearing supports 124 is in engagement with a respective one of the outer races 114 of the bearings 110. The two bearing supports 124 are stiffer than the case to be able to withstand loads applied thereto from the shaft 22 via the bearing 110. In the embodiment shown, a radial thickness of the two bearing supports 124 is greater than that of the case 122.

The bearing housing 120 further includes securing members 126 for attaching the bearing housing 120 to the casing 26 of the gas turbine engine 10. In the embodiment shown, the securing members 126 are flanges 128 extending radially outwardly from the case 122. The flanges 128 may extend circumferentially all around the central axis 11. In other words, the flanges 128 may be annular walls. Securing members 126 may have other configurations, such as tabs, non-flange annular walls, an annular bracket, etc.

The securing members 126 are configured to be secured to connecting members 28a extending radially inwardly from the casing 28. In the embodiment shown, fasteners are used to secure the securing members 126 (e.g., the flanges 128) to the connecting members 28a of the engine casing 28. Other fixation means are contemplated.

Referring to FIGS. 2-4, the bearing assembly 100 further includes a squirrel cage 140. The squirrel cage 140 may be used to offer flexibility, in a radial and/or a circumferential direction relative to the central axis 11, between the two bearings 110. In the depicted embodiment, The squirrel cage 140 is secured to the casing 28 of the gas turbine engine 10 via the bearing supports 124.

Referring more particularly to FIG. 3, the squirrel cage 140 includes members 140a that are circumferentially distributed around the central axis 11. The members 140a may also be referred to as struts, bars, arms, etc. The members 140a extend at least axially between the two bearings 110. Apertures, also referred to as scallops, A may be defined between each two adjacent ones of the members 140a. In the embodiment shown, the squirrel cage 140 includes bearing engaging sections 140b that are axially aligned with the bearing supports 124 and with the outer races 114 of the bearings 110. Each of the bearing engaging sections 140b may be in engagement with a respective one of the outer races 114 of the bearings 110. Parts of the squirrel cage 140, such as the bearing engaging sections 140b, may be located radially between the outer races 114 of the bearings and the bearing supports 124 of the bearing housing 120.

Referring to FIGS. 3-4, the cage 140 further includes at least one first tab 140c that protrudes radially inwardly from one of the bearing engaging sections 140b toward the central axis. As shown more clearly in FIG. 4, the first tab 140c is in abutment with the outer race 114 of one of the bearings 110. The first tab 140c may prevent axial movements of the outer race 114 of the one of the bearings 110 relative to the central axis 11. In other words, the first tab 140c defines an abutment shoulder to axially position one of the bearings 110. The tab 140c is one possible type of abutment to block axial movement. In another embodiment, a shoulder may be defined.

In the embodiment shown, the cage 140 defines lubricant conduits 140f; one of the conduits 140f extending at least in a radial direction relative to the central axis 11 through the bearing engaging sections 140b and another one of the conduits 140f extends within the at least one first tab 140c. In the embodiment shown, the lubricant conduit 140f that extends through the first tab 140c has a first conduit section that extends from an outer surface of the cage 140 radially inwardly toward a tip of the first tab 140c and a second conduit section that extends from the first conduit section in an axial direction toward the bearing outer race 114. These conduits 140f are used to supply lubricant to create lubricant dampers at interfaces between the bearing outer race 114 and the bearing engaging sections 140b of the cage 140. The cage 140 may be without such lubricant conduits 140f.

It may be desirable to prevent rotation of the cage 140 relative to the bearing supports 124 and the outer races 114 of the bearings 110. In the embodiment shown, a locking mechanism M is defined between the other of the bearing engaging sections 140b and the outer race 114 of the other of the bearings 110. The locking mechanism M is configured for preventing rotation of the outer race 114 of the other of the bearings 110 relative to the cage 140. In the embodiment shown, the locking mechanism M includes first and second series of circumferentially distrusted second and third tabs 140d, 114a each defined by a respective one of the cage 140 and the outer race 114 of the other of the bearings 110. The second and third tabs 140d, 114a are meshed, or interlocked with each other. Engagement of the second tabs 140d defined by the cage with the third tabs 114a defined by the outer race 114 might prevent rotation of the cage 140 relative to the outer race 114 of the other of the bearings 110. Other embodiments may include a key and keyways to block such a rotation.

In the depicted embodiment, at least one fourth tab 140e, two in the embodiment shown, extend radially outwardly from the one of the bearing engaging sections 140b. The fourth tabs 140e are received within slots 124a defined by the bearing supports 124. Engagement of the fourth tabs 140e with the slots 124a might prevent rotation of the cage 140 relative to the bearing supports 124.

In the depicted embodiment, relative rotation of the outer races 114 of the bearings 110 relative to the bearing supports 124 is limited by the engagement of the two series of second and third tabs 140d, 114e and by the engagement of the fourth tabs 140e with the slots 124a.

However, in some cases, one of the two bearings 110 may become damaged. For instance, one of the bearings 110 may seize. In a bearing seizure event, the inner and outer races 112, 114 may impede the relative rotation between the inner and outer races 112, 114.

As aforementioned, rotation between the outer races 114 of the bearings and the bearing supports 124 is limited via the squirrel cage 140. Accordingly, it might be advantageous to decouple the two outer races 114 to avoid damaging the still functioning one of the bearings 110.

In the embodiment shown, the squirrel cage 140 includes a frangible section 140a'. In the embodiment shown, a cross-sectional area of the squirrel cage at the frangible section 140a' is less than that outside the frangible section 140'. The frangible section is configured to preferentially fail upon application of a load greater than a preselected threshold bearing load. In the embodiment shown, the frangible section 140a' corresponds to the members 140a of the squirrel cage 140 are flexible to allow relative radial displacements between the two bearings 110 relative to the central axis 11. The members 140a are frangible and are configured to break upon application of a load greater than a threshold load. In other words, the members 140a create a frangible joint that connects the outer races 114 of the bearings 110.

Herein "frangible" implies that the members 140a are designed, or calibrated, to break upon application of the threshold load. The members 140a may be dimensioned so that the threshold load causes rupture of the members 140a. The members 140a may define a weakness zone located between the bearing engaging sections 140b. The weakness zone may be a zone characterized by a thickness of material less than that at locations different than the weakness. Alternatively, the weakness zone may be made of a different, less resistant, material than a remainder of the members 140a. Alternatively, the weakness zone may be a location on the members 140a where holes or apertures are defined such that less material is available to resist the load. Alternatively, a cross-sectional area of the members 140a at the weakness zone may be less than that outside said weakness zone. Any combinations of the above is contemplated without departing from the scope of the present disclosure. In the embodiment shown, the weakness zone corresponds to the entire members 140a. A local weakness zone might be added on some or all the members 140a.

The load may be an axial load, a radial load, and/or a circumferential load. The members 140a may be configured to break when either one of the axial, radial, and/or circumferential load(s) is(are) above a threshold. In the embodiment shown, the members 140a are configured to break when a difference in moments about the central axis 11 applied at the two bearing engaging sections 140b of the cage 140 exceeds a moment threshold.

For operating the bearing assembly 100, first and second bearings 110 are coupled via the squirrel cage 140; a first load is received at the first bearing 110 and a second load is received at the second bearing 110; and the frangible section 140a' of the squirrel cage 140 is failed upon a preselected load differential between the first and second loads. In the depicted embodiment, the first load is a first moment about the central axis 11 and the second load is a second moment about the central axis 11, failing the squirrel cage includes breaking the members extending at least axially between the first and second bearings and configured to break upon a difference between the first moment and the second moment increasing beyond a moment threshold. In the depicted embodiment, an axial distance is maintained between the first and second bearings 110 above a minimum axial distance.

In a particular embodiment, the squirrel cage 140 allows for dual mounting bearing outer races and for a frangible joint of both roller bearing using a single mating part. In a particular embodiment, both of the outer races 114 of the bearings 110 may be mounted to the squirrel cage prior to be installed in the bearing housing 120. Consequently, and in a particular embodiment, a common operation may be used to pull out the two bearing outer faces 114 from the bearing cavity C.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A bearing assembly for a gas turbine engine comprising at least two bearings axially spaced from one another relative to a central axis, and a squirrel cage secured to a casing of the gas turbine engine, the squirrel cage supporting respective bearing loads of the at least two bearings, wherein the squirrel cage has a frangible section between the bearings configured to preferentially fail upon application of a load greater than a preselected threshold bearing load.

2. The bearing assembly of claim 1, wherein the bearings includes rolling elements between inner and outer races, the squirrel cage is located radially between the outer races of the bearings and bearing supports, the squirrel cage connected to the casing of the gas turbine engine solely via the bearing supports.

3. The bearing assembly of claim 1, wherein the squirrel cage includes bearing engaging sections axially aligned with the at least two bearings relative to the central axis, the frangible section including frangible members located axially between the bearing engaging sections.

4. The bearing assembly of claim 3, wherein apertures are defined between each two adjacent ones of the members.

5. The bearing assembly of claim 1, further comprising at least one tab protruding radially inwardly from at least one of bearing engaging sections of the squirrel cage toward the central axis, the at least one tab in abutment against at least one of the bearings.

6. The bearing assembly of claim 1, further comprising a locking mechanism defined between one of bearing engaging sections of the squirrel cage and an outer race of a corresponding one of the at least two bearings, the locking mechanism limiting rotation of the outer race of the corresponding one of the at least two bearings and the one of the bearing engaging sections.

7. The bearing assembly of claim 6, wherein the locking mechanism includes two series of circumferentially distributed tabs each located on a respective one of the one of the bearing engaging sections and the outer race of the corresponding one of the at least two bearings, tabs of one of the two series being meshed with tabs of the other of the two series to prevent rotation of the outer race relative to the squirrel cage.

8. The bearing assembly of claim 1, wherein the respective bearing loads are moments applied to the squirrel cage by the at least two bearings, the load being a moment created by a difference in the respective bearing loads.

9. The bearing assembly of claim 1, further comprising at least one tab protruding radially outwardly from one of bearing engaging sections of the squirrel cage, the at least one tab in engagement within at least one slot defined by bearing supports of the bearing housing.

10. A gas turbine engine, comprising a shaft rotatable about a central axis, the shaft at least partially supported by two bearings and a casing, the two bearings being axially spaced apart relative to the central axis, a squirrel cage extending between the two bearings having a reduced cross-section frangible section configured to fail upon application of a bearing load greater than a preselected threshold load.

11. The gas turbine engine of claim 10, wherein the bearings includes rolling elements between inner and outer races, the squirrel cage is located radially between the outer races of the bearings and bearing supports, the squirrel cage connected to the casing of the gas turbine engine solely via the bearing supports.

12. The gas turbine engine of claim 10, wherein the squirrel cage includes bearing engaging sections axially aligned with the bearing supports relative to the central axis, the frangible section including frangible members located axially between the bearing engaging sections.

13. The gas turbine engine of claim 12, further comprising at least one tab protruding radially outwardly from bearing engaging sections of the squirrel cage, the at least one tab in engagement within at least one slot defined by the bearing supports.

14. The gas turbine engine of claim 10, further comprising at least one tab protruding radially inwardly from at least one of bearing engaging sections of the squirrel cage toward the central axis, the at least one tab in abutment against at least one of the bearings.

15. The gas turbine engine of claim 10, further comprising a locking mechanism defined between one of bearing engaging sections of the squirrel cage and an outer race of a corresponding one of the bearings, the locking mechanism limiting rotation of the outer race of the corresponding one of the at least two bearings and the one of the bearing engaging sections.

16. The gas turbine engine of claim 15, wherein the locking mechanism includes two series of circumferentially distributed tabs each located on a respective one of the one of the bearing engaging sections and the outer race of the corresponding one of the bearings, tabs of one of the two series being meshed with tabs of the other of the two series to prevent rotation of the outer race relative to the squirrel cage.

17. The gas turbine engine of claim 10, wherein the bearing load is a moment created by a difference in moments applied at the two bearings.

18. A method of operating a bearing assembly, comprising:
coupling a first bearing to a second bearing via a squirrel cage, the first and second bearings being axially spaced apart relative to a central axis;
receiving a first load at the first bearing and a second load at the second bearing; and
preferentially failing the squirrel cage at a frangible portion between the first and second bearings upon a preselected load differential between the first load and the second load.

19. The method of claim 18, wherein the first load is a first moment about the central axis and the second load is a second moment about the central axis, failing the squirrel cage includes breaking members extending at least axially between the first and second bearings and configured to break upon a difference between the first moment and the second moment increasing beyond a moment threshold.

20. The method of claim 18, further comprising maintaining an axial distance between the first and second bearings above a minimum axial distance.

\* \* \* \* \*